April 27, 1948.  F. O. IBISCH  2,440,274
HOOD FOR SIMULATED INSTRUMENT FLYING IN MULTI-CONTROL AIRCRAFT
Filed May 5, 1945

INVENTOR.
FRANZ O. IBISCH
BY
Ralph L Chappell
ATTORNEY

Patented Apr. 27, 1948

2,440,274

UNITED STATES PATENT OFFICE 2,440,274

HOOD FOR SIMULATED INSTRUMENT FLYING IN MULTICONTROL AIRCRAFT

Franz O. Ibisch, United States Navy, Columbus, Wis.

Application May 5, 1945, Serial No. 592,153

4 Claims. (Cl. 244—121)

(Granted under the act of March 3, 1883, as amended April 30, 1928; 370 O. G. 757)

This invention relates to a hood for controlling visibility in simulated instrument flying instruction in multi-control aircraft.

In the instruction of student pilots in instrument flying, the visibility of the pilot should be controlled in such a manner that, at the option of an instructor, the student's visibility outside the instruction aircraft may be impaired and yet normal visibility of the instruments within the aircraft may remain unimpaired. At the same time the visibility of the instructor or co-pilot should be unimpaired both as to the outside, as well as the instruments within the plane, in order to insure the safety of the aircraft or plane and its occupants.

It is an object of my invention to selectively obscure the outside view of a pilot and yet permit the pilot to have an unimpaired view of instruments within an aircraft or plane.

It is a further object of my invention to obscure the outside view of a pilot but not interfere with a safe angle of vision or the outside view of a co-pilot.

It is a further object of my invention to provide a hood of the type described which may easily be removed from operative position in a plane when its use is not desired.

The preferred manner of accomplishment of these and other objects of the invention will become apparent on a study of the specification and accompanying drawing, wherein.

Figure 1:
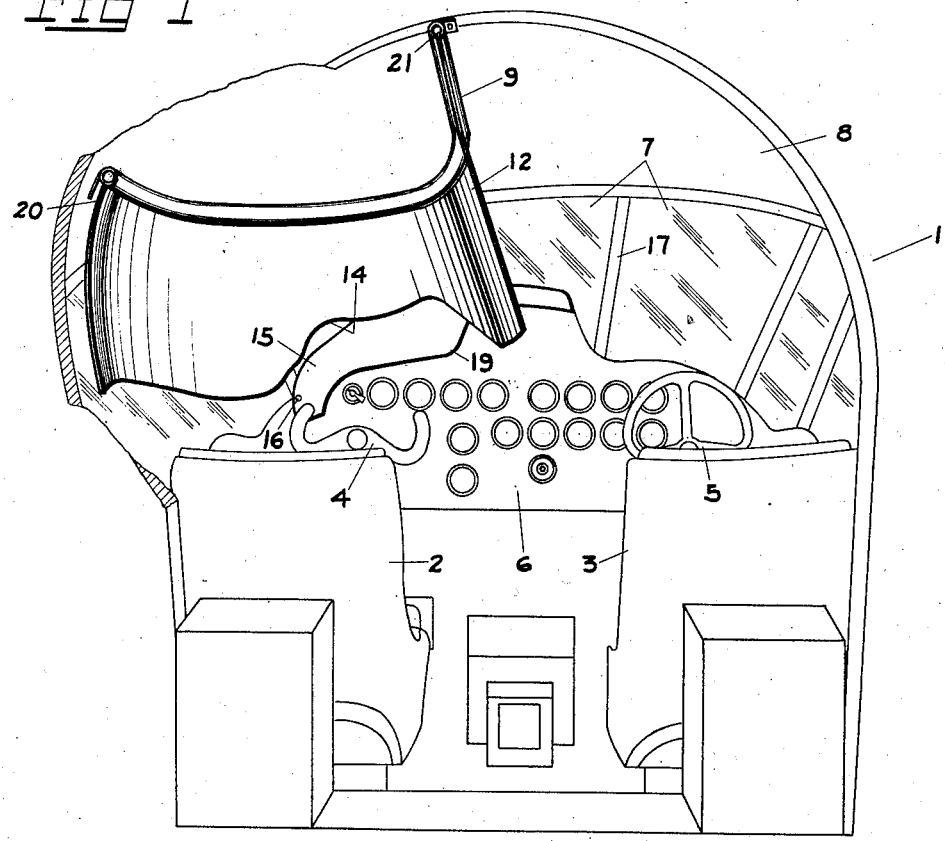
Fig. 1 is a view looking into the interior of the cockpit of a dual control airplane with a hood embodying my invention in operative position.

Referring more in detail to the drawing:

Fig. 1 shows the interior of the cockpit of a conventional dual control aircraft, designated generally as 1. The cockpit is provided with seats 2 and 3 for the pilot and co-pilot respectively. The plane has dual controls 4 and 5 and conventional instruments mounted on the instrument panel 6 in front of the seats. The front and side walls of the cockpit contain transparent windows designated generally as 7. The cockpit has an opaque overhead 8.

My invention preferably comprises a guideway or track 9 secured by suitable means to the overhead 8. The guideway extends from adjacent the rear edge of the window at the side of the pilot's seat 2, across the top of this window, across the top of the window in front of the pilot's seat to a point substantially opposite the inner or inboard edge of the pilot's seat and then rearwardly beyond the rear of the pilot's seat.

Figure 4:
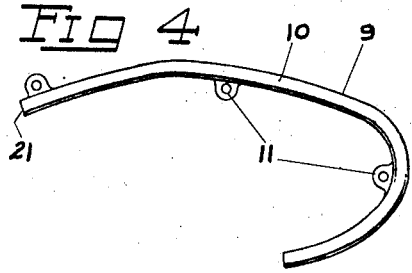
Fig. 4 is a bottom plan view of a guide track used to support the hood.

The guideway is shown in detail in Fig. 4. It is preferably made of metal or other rigid material and preferably is substantially tubular in cross section. The lower wall of the guideway contains a slot 10 to receive an edge of the hood. The outline of the guideway is substantially as shown in Fig. 4 to enable it to extend around the pilot's seat in the cockpit in the manner described. It may of course be necessary to vary the specific outline of the guideway depending on the shape of the cockpit in which it is to be used. The guideway has a series of lugs or supporting brackets 11, preferably welded thereto, to enable it to be secured to the overhead of the aircraft in supported relation thereto by suitable fastening devices.

A hood 12 is slidably supported adjacent its upper edge in the guideway 9.

Figure 2:
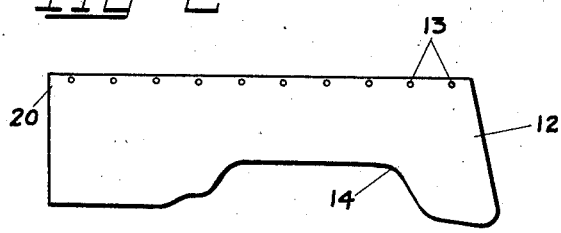
Fig. 2 is a side elevational view of the hood removed from the plane.

The details of the preferable form of hood 12 are shown in Fig. 2. The hood is made of a relatively heavy flexible material, such as phenolic resin of appropriate plasticity. A series of double-headed rivets 13 are secured in the hood adjacent its upper edge to ride in the guideway on opposite sides of the slot 10 and thus enable the hood to be slidably supported in the guideway. The configuration of the lower edge of the hood is such as to define a shape for the hood that obscures the view of the occupant of the seat 2 of objects outside the plane and yet permits him to view the instruments in the plane with unimpaired visibility. This configuration necessarily varies for different types of planes, but a configuration as shown in Fig. 2 may be regarded as typical, and in this instance has a cut-out portion 14 to give the student a full view of the whole instrument panel.

In using the invention with certain types of planes, it may be necessary to employ a supplementary or complementary hood directly above the instrument panel in order to cooperate with the hood 12 in obscuring the vision of the occupant of the seat 2 completely as to things outside the aircraft without interfering with his view of the instruments within the aircraft.

Figure 3:
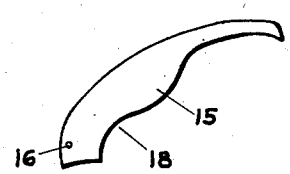
Fig. 3 is a side elevational view of a supplementary hood that may be desirable in some types of aircraft.

Such a supplementary hood, designated 15, is shown in Fig. 3. The hood 15 is preferably made of the same material as the hood 12. When used, the hood 15 is mounted on and extends above the instrument panel over a portion of the front window 7. Fastening devices 16 may be provided to secure the hood in place, the fastening devices being suitably arranged, as in the cowling or framework 17 for the windshields or windows 7. The configuration of the hood 15 is varied, depending on the shape and size of instrument panel and window of the type of plane employed, but a configuration as shown in Fig. 3 may be regarded as typical. In this instance, the lower edge 18 of the hood 15 is cut to conform to the instrument panel 6 as shown at 19, Fig. 1.

*Operation*

When an aircraft is to be used in instructing a pilot in simulated instrument flying, the track or guideway 9 is mounted in the plane's overhead above the student pilot's seat 2 by means of the lugs or brackets 11. The appropriate end 20 of the studded upper edge of the hood 12 is then inserted in the open inner end 21 of the guideway slot 10. The slot 10 is open so that the hood may be readily inserted or removed from the guideway, the guideway serving to bend the hood according to the track and thus be shaped to limit or control the visibility of the student pilot relative to the outside of the aircraft.

If needed to additionally obscure outside vision, for example when the lower cutout portion of the hood 12, normally allowing unimpaired visibility of the instrument panel also allows visibility forwardly through the window panels 7, the supplementary hood 15 is placed above the instrument panel to close off that line of vision or, in effect, fill in on the window panel for the hood 12 cutout portion 14.

When the hoods are thus properly arranged, the outside view of the occupant of the seat 2 is effectively obscured, but his view of the instruments is unimpaired. At the same time, the occupant of the seat 3 is able to see outside the plane, as well as the instrument panel, and control the plane in safety if need be.

A particularly useful function of the invention is for pilot training in low approach procedures. It is desirable to have a means of simulating breaking-out through a low overcast, to have normal visibility of all instruments at all times, and to have good safety pilot visibility. Breaking-out of or into an overcast is simply and immediately simulated by slipping the hood 12 backward and forward respectively in the guide 9 by either the student or instructor pilot.

When the plane is not being used for instruction in instrument flying, the hoods are easily removed and may be stowed in a convenient place.

I have described one embodiment of my invention. However, it will be apparent that the device is susceptible to numerous modifications without departing from the spirit of the invention. Therefore, I do not wish to be limited by the disclosure set forth hereinbefore, but only by the scope of the appended claims.

The invention described herein may be manufactured and used by or for the Government of the United States of America for governmental purposes, without payment of any royalties thereon or therefor.

I claim:

1. In an airplane having dual controls and instruments, a seat for an operator behind each control, transparent windows at the front and sides of the seats and an opaque overhead, a tubular guideway slotted along its lower surface secured interiorly of the plane to the overhead and extending from adjacent the rear edge of one side window forwardly above the window, laterally from adjacent the forward edge of said side window above the front window beyond the inner edge of the adjacent seat, then rearwardly to a point rearward of the seats, a flexible hood having means adjacent its upper edge engaged in said guideway to support the hood slidably in said guideway, said hood substantially surrounding one seat at both sides and at the front, and a second hood mounted in the front window above the instruments, said second hood cooperating with said first hood to obscure the outside vision of an occupant of the seat and permitting the occupant to view the instruments.

2. In an airplane having dual controls and instruments, a seat for an operator behind each control, transparent windows at the front and sides of the seats and an opaque overhead, a tubular guideway slotted along its lower surface secured interiorly of the plane to the overhead and extending from adjacent the rear edge of one side window forwardly above the window, laterally from adjacent the forward edge of said side window above the front window to a point beyond the edge of the adjacent seat, then rearwardly to a point rearward of the seats, and a flexible hood having its upper edge slidably supported in said guideway to surround one seat at both sides and at the front and being of such dimensions that the windows are obscured to an occupant of the seat and the instruments are visible to such occupant.

3. In an airplane having an instrument panel and dual controls, a seat for an operator behind each control, transparent windows in front and to the sides of the seats, an opaque overhead, an opaque hood depending from the overhead and extending forwardly from adjacent the rear margin of one side window, then laterally from adjacent the forward margin of said side window to a point adjacent the inner margin of the adjacent seat, then rearwardly, and a second opaque hood mounted above the instrument panel in overlying relation to the front window, the hoods cooperating to obscure the outside vision of an occupant of said seat while permitting the occupant to view said instrument panel, the second hood obscuring that portion of the view through the front window not obscured by the first hood.

4. In an airplane having an instrument panel and dual controls, a seat for an operator behind each control, transparent windows in front and to the sides of the seats, an opaque overhead, and an opaque hood depending from the overhead and extending forwardly from adjacent the rear margin of one side window, then laterally from adjacent the forward margin of said side window to a point adjacent the inner margin of the adjacent seat, then rearwardly, the hood surrounding both sides and the front of said seat and being of such dimensions that the windows are obscured to an occupant of said seat while the instrument panel remains visible to such occupant.

FRANZ O. IBISCH.

REFERENCES CITED

The following references are of record in the file of this patent:

UNITED STATES PATENTS

| Number | Name | Date |
|---|---|---|
| 17,967 | Graves | Aug. 11, 1857 |
| 1,833,970 | Levick | Dec. 1, 1931 |
| 2,090,132 | Lacoe | Aug. 17, 1937 |
| 2,322,770 | Ocker | June 29, 1943 |
| 2,403,195 | Ross | June 2, 1946 |

OTHER REFERENCES

"Popular Mechanics" of November, 1943, page 59.